United States Patent [19]

Brankamp et al.

[11] Patent Number: 4,523,483
[45] Date of Patent: Jun. 18, 1985

[54] PRESS APPARATUS FOR DETECTING A FORCE OCCURRING BETWEEN TWO OPPOSITELY MOVABLE MACHINE PARTS

[75] Inventors: Klaus Brankamp, Sperberweg 10,, 4006 Erkrath 1; Heinz B. Bongartz, Düsseldorf, both of Fed. Rep. of Germany

[73] Assignee: Klaus Brankamp, Erkrath 1, Fed. Rep. of Germany

[21] Appl. No.: 493,371

[22] Filed: May 10, 1983

[30] Foreign Application Priority Data

Nov. 29, 1982 [DE] Fed. Rep. of Germany ....... 3244171

[51] Int. Cl.³ .............................................. G01L 5/00
[52] U.S. Cl. ..................................... 73/862.54; 72/32
[58] Field of Search ........... 73/862.06, 862.53, 862.54, 73/862.55; 72/31, 32

[56] References Cited

U.S. PATENT DOCUMENTS

| | | | |
|---|---|---|---|
| 2,925,576 | 2/1960 | Wakeland et al. | 73/761 X |
| 3,091,961 | 6/1963 | Piell | 73/862.55 |
| 4,175,430 | 11/1979 | Morrison et al. | 73/862.55 |
| 4,342,233 | 8/1982 | Edmondson et al. | 73/862.06 |
| 4,402,232 | 9/1983 | Stegmuller et al. | 73/862.55 |
| 4,429,579 | 2/1984 | Wilhelm | 73/761 X |

*Primary Examiner*—Charles A. Ruehl
*Attorney, Agent, or Firm*—Becker & Becker, Inc.

[57] ABSTRACT

A cold-solid deformation press with which there is detecting of a force occurring between two oppositely movable machine parts for monitoring especially of cyclically repetitive production processes, for example by deformation or machining. Desired values determined and stored in a preliminary run are continuously compared with actual values during the production. In order to improve the information-giving capability of such a process monitoring, and to protect the force-measuring elements against over-loading with simultaneous miniaturizing thereof, at least one significant component of force is detected in the form of stresses in at least one of the machine parts as the desired and actual values of the force which is to be monitored.

8 Claims, 11 Drawing Figures

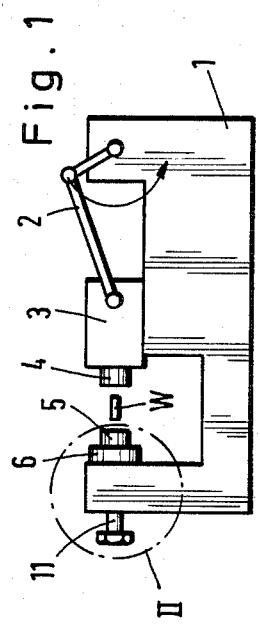
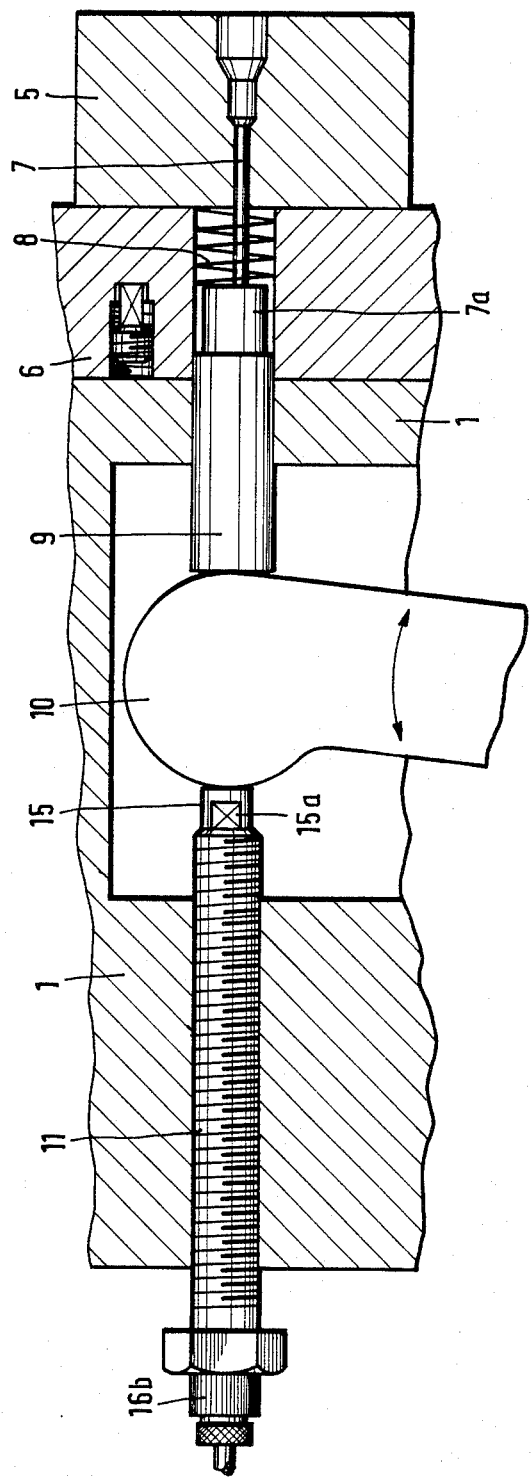

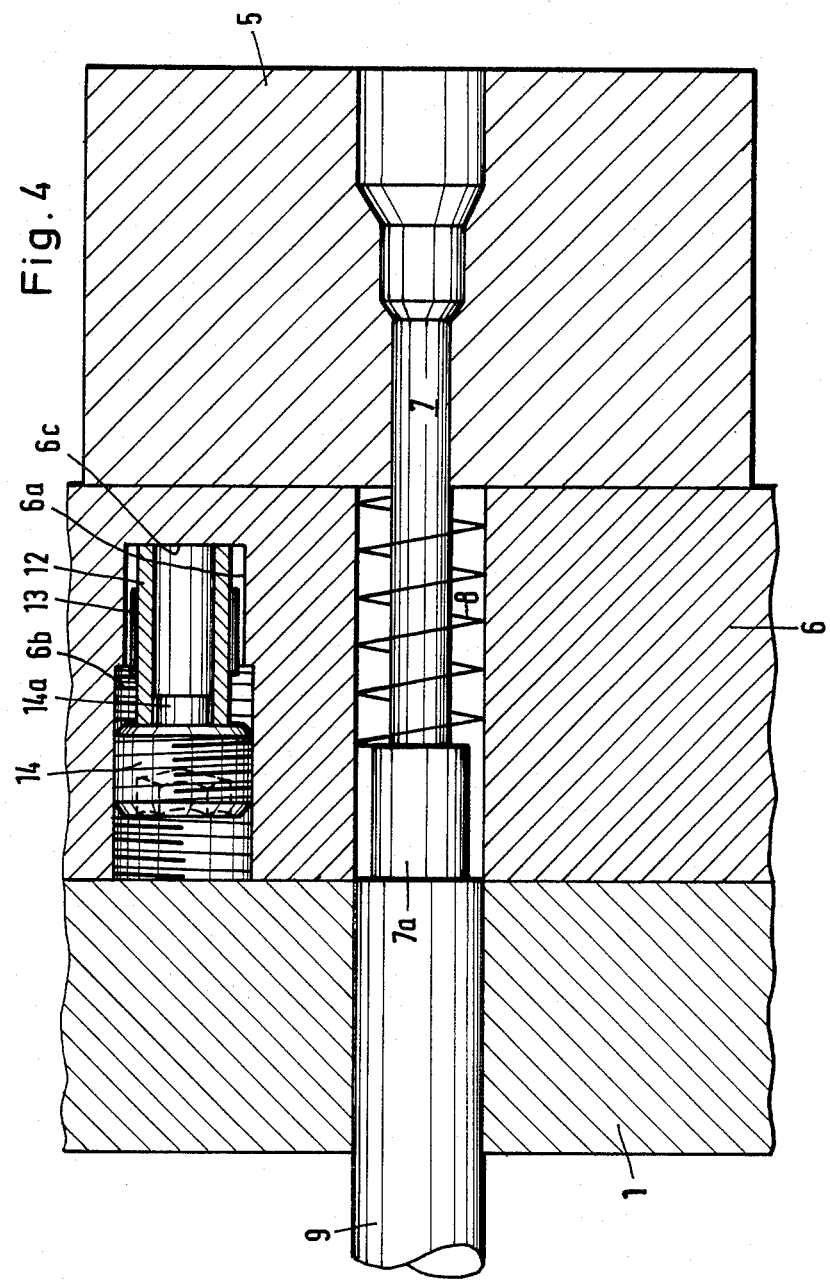

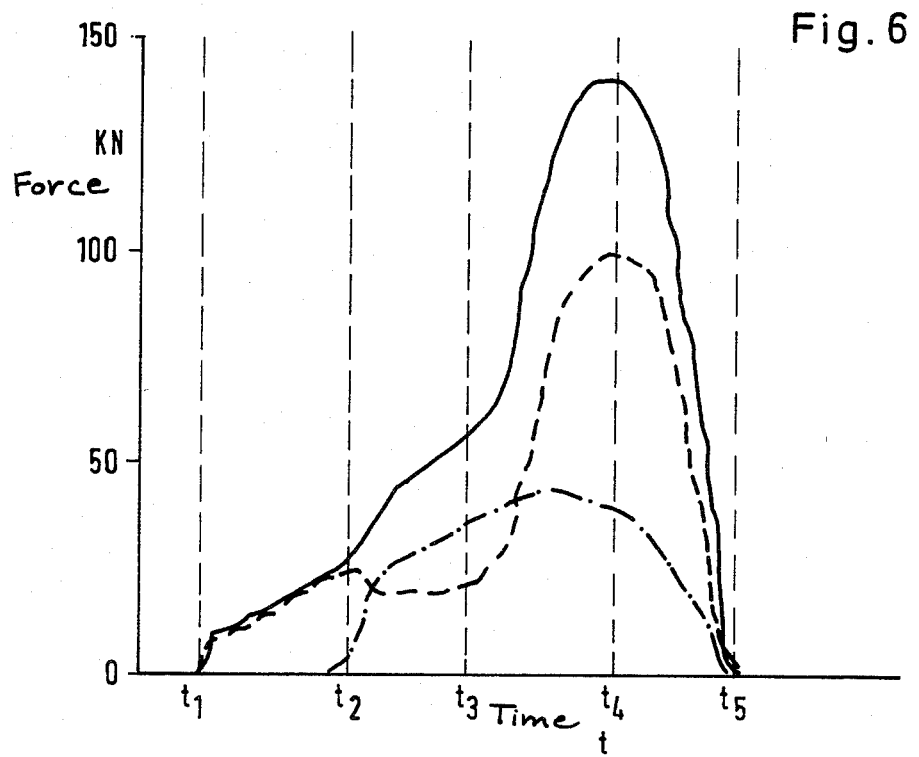
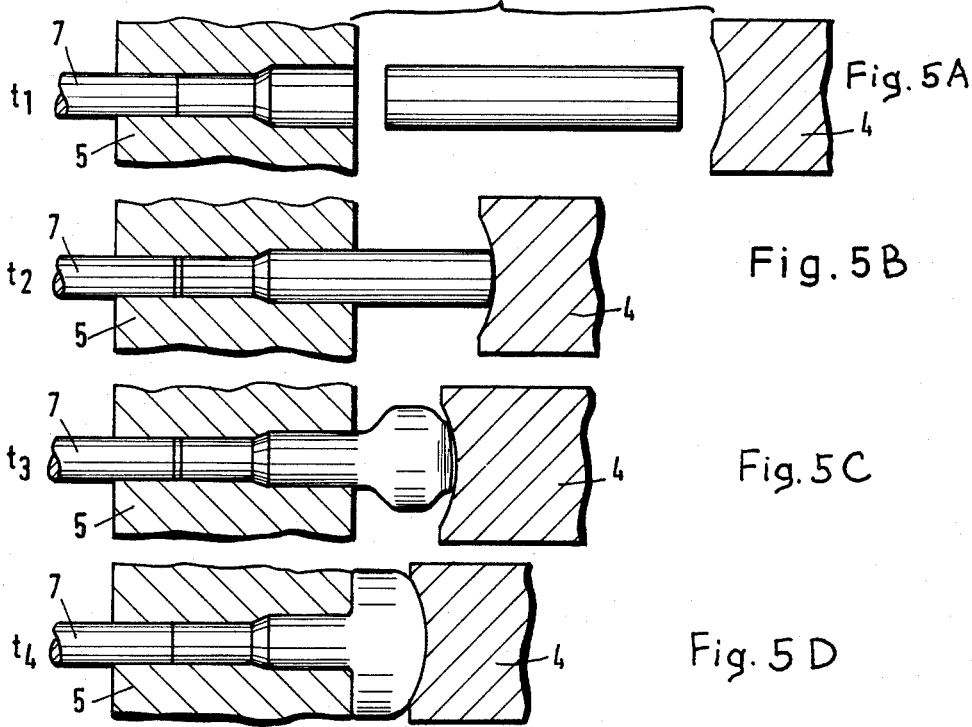

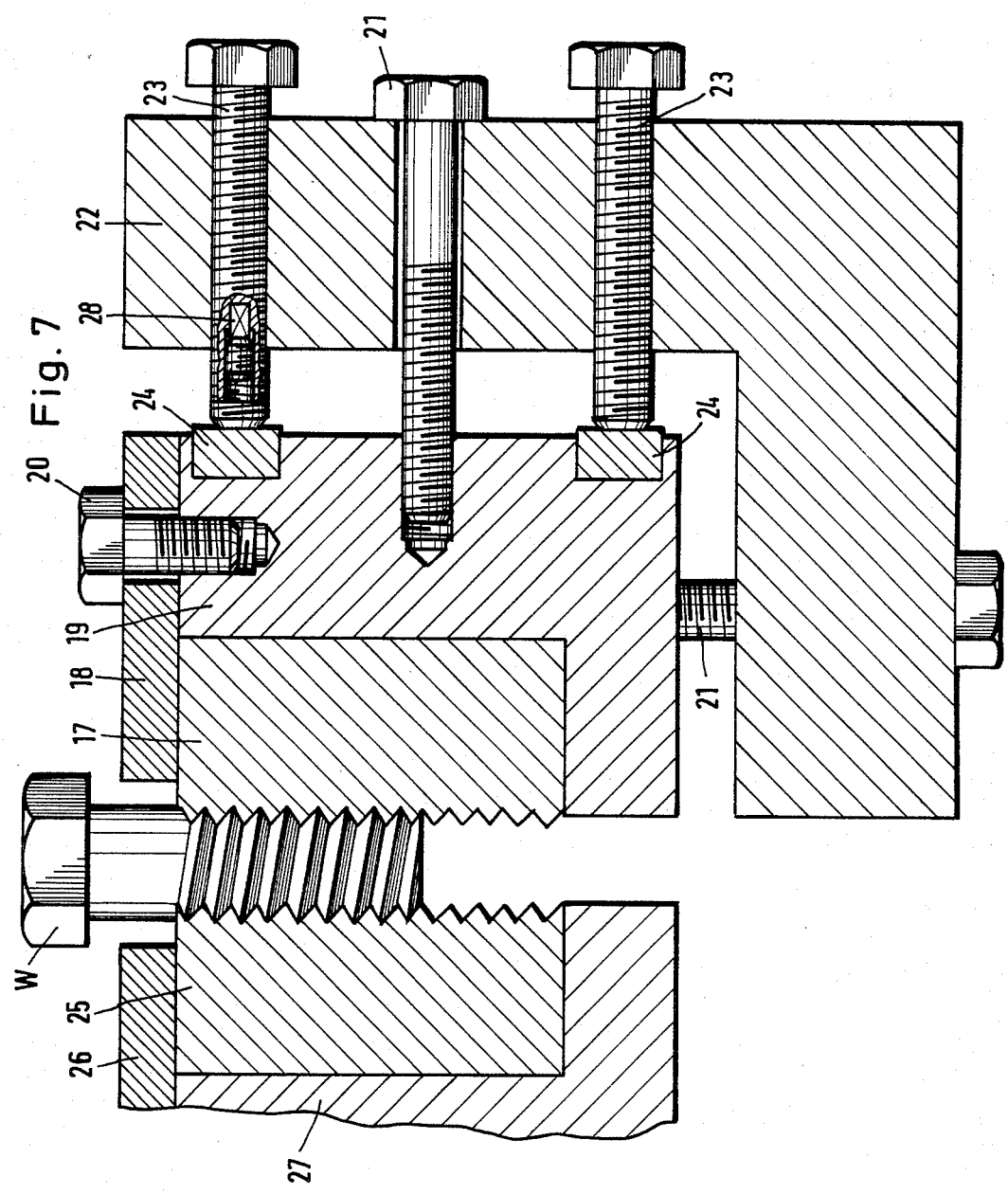

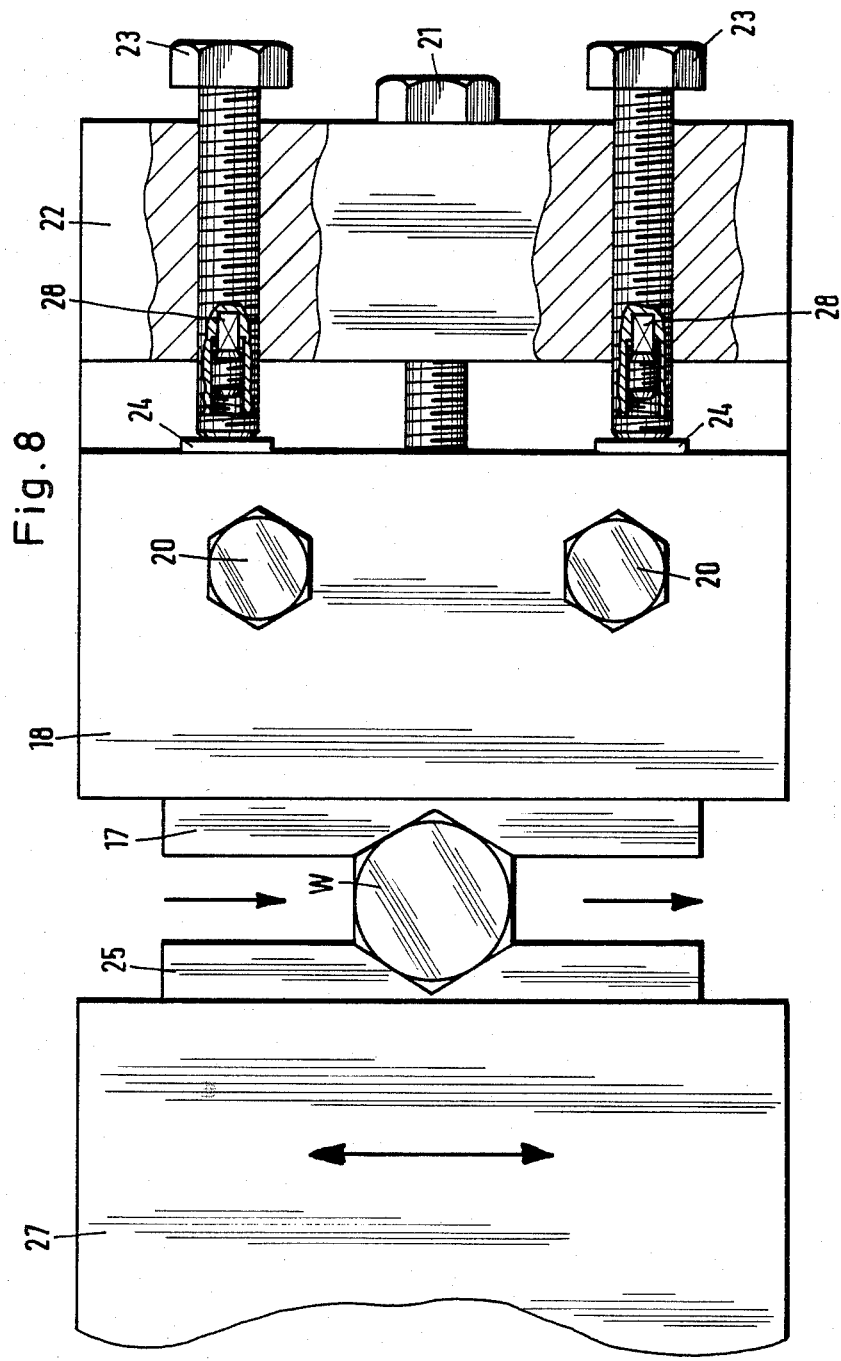

PRESS APPARATUS FOR DETECTING A FORCE OCCURRING BETWEEN TWO OPPOSITELY MOVABLE MACHINE PARTS

BACKGROUND OF THE INVENTION

The present invention relates to an arrangement for detecting a force, which occurs between two oppositely movable machine parts, for monitoring especially cyclically repetitive production processes, for example by deformation or machining, whereby desired values determined and stored in a preliminary run are continuously compared with the actual values during the production. Furthermore, an apparatus is provided for carrying out the foregoing procedure, and finally a cold-solid deformation press or punch is provided which has at least one tool comprising a matrix and a punch; the tool additionally is provided with an ejector pin which can be actuated by an ejector lever and can be adjusted by an adjusting screw; the force absorbed by the tool is monitored pursuant to the present invention.

In a majority of cases, during production or manufacture of parts, it is necessary to produce the final shape of the parts by giving an appropriate shape to the blanks or intermediate products. With such a profiling for producing parts, features are preponderantly employed with which the profiling occurs by the application of force between a tool and the workpiece. The profiling can occur either by a deformation or forming of the workpiece to the tool shape, or by chip-removing according to which, proceeding from a blank, the excess material is removed with suitable tools until the finished contour is obtained. In both cases, forces arise between the tool and the workpiece, which forces affect the profiling.

For such profiling there is characteristic that correlations exist between the forces effective during the profiling and the produced design or configuration of the workpiece; these correlations make it possible to draw conclusions from the behavior of the process forces, especially as to whether the profiling procedure occurs orderly, i.e., in its entirety in the provided way and manner.

German Pat. No. 26 43 759 discloses a method for monitoring cyclically repetitive production processes; this method permits automatic monitoring of production machines with the aid of the process forces as monitoring parameters. This method has in the meantime proven itself in practice, and has found wide acceptance in the industry.

A prerequisite for using this method is that significant information is obtained from the respective production process for the process behavior. The quality of the production monitoring is that much better the more significant the information is therewith. Through a series of investigations, there was confirmed in the meantime that the most significant information for the production monitoring can be obtained from the aforementioned process forces, because here the clearest correlation exists between the behavior of the forces and the progress of the profiling procedure.

In order to be able to detect the forces occurring between the tool and the workpiece during production, it is known to detect the forces occurring between two oppositely movable machine parts by determining the effect or application of the respective force on an intermediate part located between the two machine parts. The force applications on this intermediate part are converted into electrical signals, so that only such electrical signals have to be evaluated. The conversion of the force applications into electrical signals is possible either according to the piezoelectrical measuring method or by the use of stress-measuring strips. During a piezoelectric measuring procedure, quartz discs are pressure-loaded, whereby the charges induced on the quartz surface during the pressure-loading of the quartz discs is directly proportional to the force transmission. During the conversion method using stress-measuring strips, these strips are applied to the force-biased part in such a way that they participate in the expansion or compression of this part. The expansions or compressions lead to a change of resistance of the wire loops provided in the expansion measuring strips, whereby force-proportional electrical signals are obtained.

For detection or determination of a force arising between two oppositely movable machine parts for monitoring production processes, it was previously customary to produce a special intermediate part which was inserted in the flux of force between the two oppositely movable machine parts, and which transferred the entire force between the two machine parts. German Pat. No 28 14 988, for example, discloses an apparatus for detecting a force occurring between two oppositely movable machine parts; with this apparatus, the intermediate part is loaded with the entire forces arising in a machine part, and to avoid an overloading in a separating plane provided for the intermediate part of the machine part, while forming a gap, this intermediate part is arranged in such a way that the gap is closed when a predetermined force is reached. The intermediate part, which is provided with force-measuring elements, for example stress-measuring strips, is protected against overloading in this manner.

For carrying out the known method for detecting a force arising between two oppositely movable machine parts, it was therefore necessary to change the structure of the respective machine which was to be monitored to the extent that intermediate parts provided with measuring elements had to be inserted in the flux of force of the machine. The entire process forces for the profiling procedure had to be transferred through these intermediate parts so long as the predetermined value of an overload was not exceeded thereby.

These known measures for carrying out the known monitoring method, however, are not only complicated and costly, but also prevent an expansion of the process monitoring in that:

in many machines no space is available for subsequent accommodation of force-measuring elements;

alteration of the machine construction is too costly with respect to the installation of force elements, so that a process monitoring can no longer be economically employed;

the operating range of the machine is restricted, for example by a shortening of the length of stroke of presses; and the force-measuring elements can be arranged only so far from the central process phenomenon that no longer solely purely process forces are measured, but rather superimpositions occur with dynamic forces in the machine support and with other forces from driving elements of the remaining machine mechanism.

It is an object of the present invention, starting from the previously described state of the art, to provide a press apparatus for detecting or determinating a force which occurs between two oppositely movable machine parts for monitoring production processes. The press apparatus is to make it possible to detect significant stresses of the production processes, for example by deformation or machining, not only with newly produced machines, but also with production machines already being employed in the industry, so that for production monitoring, desired values determined and stored in a preliminary run can be continuously compared with the actual values during the production. The cost for originally equipping or supplementing for the inventive press apparatus associated therewith is to be reduced to a minimum, whereby the forces to be detected additionally are to be detected where the forces are procedurally significant to the greatest extent, preferably in the direct vicinity of the profiling region of the machine. The press according to the present invention, and the apparatus associated therewith, finally should be usable with widely differing profiling processes to avoid uneconomical design approaches for individual machines.

BRIEF DESCRIPTION OF THE DRAWINGS

These and other objects and advantages of the present invention will appear more clearly from the following specification in conjunction with the accompanying drawings, in which:

FIG. 1 is a schematic side view of a horizontal crank press for producing blanks for screws by cold-solid deformation, or working;

FIG. 2 is a partially sectioned fragmentary view of that portion of the crank press encircled by a dot-dash line in FIG. 1;

FIG. 4 is an enlarged, partially sectioned fragmentary view of the intermediate plate and the adjacent structural parts from the right part of the illustration in FIG. 2;

FIGS. 5A, 5B, 5C, and 5D schematically show four operating sequences of the deformation of a workpiece blank into a blank for a screw;

FIG. 6 is a force-time graph of the components of force measured on the crank press of FIGS. 1 through 4;

FIG. 7 shows a second embodiment of the apparatus according to the present invention, and in particular is a vertical section through the tool of a thread-rolling machine; and FIG. 8 is a plan view of the tool of FIG. 7.

SUMMARY OF THE INVENTION

Figure 3:
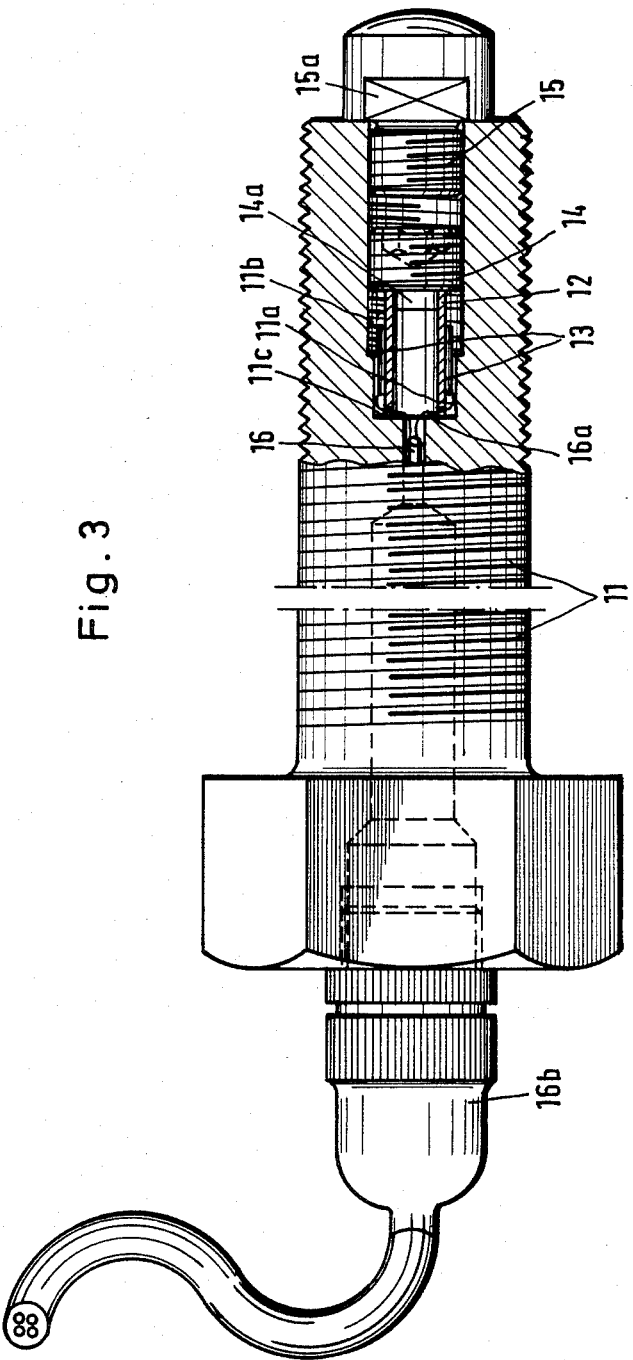
FIG. 3 is an enlarged, partially sectioned view of the setscrew or adjusting screw for the ejector needle or pin, which screw is employed in the crank press of FIGS. 1 and 2.

The press apparatus of the present invention is characterized primarily by means for detecting at least one significant component of force in the form of stresses in at least one of the machine parts as desired values and actual values of the force which is to be monitored.

With this proposal according to the present invention, the detection of the entire force occurring during the production process between two oppositely movable machine parts is eliminated, and in place thereof only at least one significant component of force in the form of stresses occurring in at least one of the machine parts is detected. In this manner, it is possible, for monitoring the production process, to detect forces close to the process in the form of stresses, the absolute magnitude of which is only a fraction of the entire forces previously detected for production monitoring. This makes possible not only the employment of smaller and hence simpler force-measuring elements, but also creates the condition for installation of these force-measuring elements in machine elements which are arranged in the vicinity of the actual profiling process. By employing such machine elements for detecting a component of force which is significant for the production monitoring, previously necessary alterations in the machine construction, especially the installation of intermediate parts which require a lot of space relative to the entire force to be transferred or transmitted, can be eliminated.

Pursuant to a further feature of the present invention, the stresses may be ascertained within those machine elements which are materially affected in the force transfer.

If, as an example, the force flux is considered during the support of a tool on the machine, all of the forces effective on the tool during the profiling are transferred via this support surface onto the machine. These forces are distributed more or less uniformly onto the entire engagement surface, so that a certain surface pressure exists at each point of this support or engagement surface. In conformity with this surface pressure, a stress distribution results below the engagement surface, whereby in the direct vicinity of the engagement surface, the stresses are the greatest, and farther away the stresses gradually decrease as they are conveyed over wider cross sectional areas in conformity with the force flux in the machine. Stresses correspondingly due to the respectively prevailing mechanical principles occur in conformity to the stresses effective locally at any given time.

Just like the overall force of the process, the material stress or compression at any location below the engagement surface is significant for the process behavior. If this process behavior of the machine, and hence the profiling force, changes, then the stress or compression at the designated location necessarily also changes. This interrelationship is true even when, for example by change of the deformation forces not only as to the level and course thereof, but also as to the point of application or the direction thereof, the entire surface pressure distribution in the engagement surface changes, with the result that, at the same time, a change of the distribution in stress is connected therewith. Also, in this event, the stress change occurring at any point indicates that and how the process behavior has changed.

By means of the proposal according to the present invention, the force-impacted machine element can be maintained in its entirety when there succeeds the detection of the strain or material tensioning or compressions effective therewith for the determination of a significant component of force of the process in a subrange or region of the machine element.

Since with the machines which are now being utilized, the structural free space is completely used for the profiling process, normally no space remains to install additional machine elements. For this reason, existing machine elements are to be employed for the force detection pursuant to the present invention, and these existing machine elements are modified for ascertaining the stresses, whereby for reasons of economic feasibility, only such machine elements are to be changed where the cost to do so is as small as possible. This is the case especially with setscrews, fastening screws, and other adjustment and fastening elements, as well as with support parts in the tool region of the machine. In order to keep to a minimum the necessary cost for production monitoring where a machine has been modified, it is proposed according to the present invention to ascertain the stresses within machine elements which remain in the machine or the tool during an interchange of the direct profiling tool parts. In this case, the machine elements equipped for detecting components of force need not also be changed over if a different tool or a different direct profiling part of the tool is utilized.

In a further proposal according to the method of the present invention, several components of force in the form of stresses may be detected, each of which is significant for a typical characteristic of the production process. In so doing there is attained the great advantage that, in place of the entire force detected with previously known methods, there are now detected only smaller components of force of smaller magnitude, which components of force are not only easier to ascertain, but can also be ascertained closer to the actual profiling process; additionally, differentiated information concerning the production process to be monitored is imparted, so that more precise information can be given about the causes of disturbances, especially during deviations of the actual values, obtained during the production, from the desired values.

To the extent that a production machine includes several deformation stations, as is the case for example with multistage presses, the significant components of force are detected in the form of stresses in at least one of the machine parts for each deformation stage. The production monitoring according to the present invention can thus be differentiated based on the individual deformation stages. It is, of course, possible for each deformation stage to also detect several component forces in the form of stresses in order to increase the information-giving capability of the monitoring.

The press apparatus for carrying out the present invention is characterized primarily in that a force-measuring element is inserted in a recess or hole of at least one machine element which transfers a component of force, and is fixed free of play by at least one tightening or holding element. With the aid of this force-measuring element, a significant component of force in the form of stresses in the machine element is detected as a desired value and actual value of the force to be monitored. Since the entire force which is to be transferred from the machine element does not have to be detected, the recess in the machine element can be small, so that neither is there materially affected the stress distribution within the machine element, nor is there affected the strength of the machine element necessary for the process. The force-measuring element which is to be inserted or installed in the recess or hole serves only for detecting stresses, so that the dimensions thereof can be kept small, especially since no danger of overloading exists. Important is only that the recess or hole be provided in a region of the machine element in which stresses relevant to the process are effective.

The recess which is to be provided in the machine element can be a through-bore in which the force-measuring element is retained by two holding elements in such a manner that it is in a position to receive or detect the stresses which occur in adjacent material of the machine element. According to a preferred embodiment of the present invention, the recess is made as a center hole or bore in which the force-measuring element is fixed free of play by a holding element between the base of the bore and the holding element.

Although the possibility exists for using wedges or a straddling dowel, it is proposed pursuant to a further development according to the present invention, that the holding element be a setscrew that is screwed into a segment of the bore provided with an inner thread. In so doing, the structural costs and the space requirement of the force-measuring element which is to be accommodated in the machine element can be further reduced.

Pursuant to a preferred embodiment according to the present invention, the force-measuring element is tubular and is provided on its outer surface with at least one stress-measuring strip. In this case, the setscrew is inventively provided with a centering extension for the tubular force-measuring element. With this construction, a quantitatively regulated prestressing or preload is applied to the force-measuring element via the setscrew, so that not only is any play avoided, but, after an equalization of the preload in the subsequently connected amplifier, the force-measuring element can also satisfactorily measure small forces, and with a continuous straight characteristic line or curve. The setscrew at the same time undertakes the centering alignment and lateral fixation of the force-measuring element.

With an alternative embodiment, the force-measuring element is a measuring cell or analyzer which operates according to the piezoelectric measuring method. A miniaturization of the force-measuring cell can also be achieved with this embodiment, and the cell can be installed in a machine element in such a way that elongations or compressions of the material surrounding the force-measuring element are necessarily transmitted thereto, so that material stresses can be detected in massive or solid machine elements. The same material stresses occur for instance at the same modulus of elasticity along the wall of the force-measuring element as occurring in the adjacent material of the machine element, and moreover independently of the cross section thereof. The construction according to the present invention furthermore includes an effective overload protection.

Depending upon the process, it is quite possible that during disturbance of the production process, extraordinarily high process forces occur; this, for example, is the situation during deformation processes when unintentionally more material, for example several parts at the same time, come between the tools. Abnormal force peaks are possible after a tool failure during machining processes. The machine structures are therefore customarily designed with appropriate margins of safety. With the apparatus for force detection according to the present invention, more stress is never applied to the force-measuring element than is applied to the surrounding material of the machine element. The force-measuring element is consequently afforded the same protection against overloading as is the machine element in which it is installed. Such an overload protection is not possible with the known force-measuring methods, where the entire flux of force of the process is transmitted via the force-measuring element, unless the force-measuring element is considerably oversized, as a result of which, however, not only does the sensitivity suffer, but also the possibility for its employment.

Just like the insertion of the force-measuring element, the corresponding cable channels to the electrical connection can be provided by bores within the machine element. For this purpose, it is proposed pursuant to the present invention that the holding element be provided with a central bore for the measuring or slide wires of the force-measuring element.

Adjusting screws and fastening screws in the tool region of the machine are especially suitable for detection of process forces, and in particular because, as required by the construction, the screw heads always lie in a region of the machine which is freely accessible in order to make it possible for the machine operator to make the necessary adjustment and fastening operations. Hereby, at the same time there is made available a channel for the cable outlet in order for it to pass to the outside from the structurally generally inaccessible central region of the process.

The method according to the present invention is preferably used for cold-solid deformation presses, which have at least one tool comprising a matrix or die and a punch, with the tool additionally being provided with an ejector pin which can be adjusted by an adjusting screw and can be actuated by an ejector lever. In order with such a cold-solid deformation press or compression mold to be able to monitor the cyclically repetitive production process in such a way that desired values determined and stored and in a preliminary run are continuously compared with the actual values during production, it is finally proposed pursuant to the present invention, for detecting significant components of force of the force which is to be monitored as desired and actual values, to arrange a force-measuring element in the adjusting screw for the ejector pin, and to arrange at least one force-measuring element in a machine element which supports the matrix and/or the punch relative to the machine support or relative to the carriage. This construction according to the present invention has the advantage that components of force of the force necessary for the deformation procedure are detected in the form of stresses which are highly indicative for the deformation procedure, so that not only can errors be rapidly recognized, but also accurate conclusions can be drawn as to the cause thereof.

DESCRIPTION OF PREFERRED EMBODIMENTS

Referring now to the drawings in detail, there are shown two embodiments of an apparatus according to the present invention, as well as setting forth an operating sequence of a production process. These embodiments are illustrated with the aid of several arrangements or steps along with a diagram, by means of which not only the embodiments of the present invention, but also examples for the associated apparatus, are to be explained.

The horizontal crank press illustrated in FIG. 1 for better understanding is employed with the exemplary embodiment for producing blanks for screws from cylindrical workpiece blanks. The crank press has a machine support or frame 1 upon which a carriage, which can be shifted by a crank drive 2, is guided in such a way as to be longitudinally movable. A punch 4 is mounted on the carriage 3; during each cyclically repetitive production procedure, the punch 4 pushes a workpiece W into a matrix or die 5 to deform the workpiece W, as will be subsequently explained with the aid of FIGS. 5A-5D. The matrix 5 is in turn supported on the machine support 1 via an anvil or intermediate plate 6, as shown especially by the general illustration in FIG. 1.

As apparent from FIG. 2, the matrix 5, on that side thereof facing the punch 4, is provided with a stepped or graduated center hole or bore for forming the subsequent shaft of the screw; this bore, in the direction toward the intermediate plate 6, merges into a bore having a smaller diameter. In this bore of smaller diameter there is located an ejector needle or pin 7, which is subjected to the force of a return spring 8, and an enlarged end piece 7a thereof, which at the same time serves as an abutment against the matrix 5 and engages against a plunger or thrust bolt 9.

This thrust bolt 9 is guided in such a way as to be axially shiftable in the machine support 1, and is actuated by an ejector lever 10, which is driven in a suitable or expedient manner, in order, after each deformation procedure and after retraction of the punch 4, to eject the produced screw blank from the matrix 5 by actuating the ejector rod or pin 7. The front end of the ejector pin 7 simultaneously forms the limit of the profiling center hole or bore within the matrix 5. In order to be able to adjust or set the exact length of the shaft of the screw being produced, the rear end position of the ejector lever 10, and hence also of the ejector pin 7, is limited by a setscrew or adjusting screw 11, which is screwed into the machine support 1 in axial alignment with the thrust bolt 9, as recognizable likewise in FIG. 2. The depth of introduction or insertion of the workpiece blank W into the matrix 5 is thus finally fixed by the adjusting screw 11.

As evident from the operating sequence of the deformation procedure shown in FIGS. 5A, 5B, 5C and 5D, the workpiece blank W is held between the punch 4 and the matrix 5 in such a way that it is pushed into the profiling center hole or bore of the matrix 5 during the subsequent movement of the carriage 3 in a direction toward the matrix 5. In so doing, as shown in FIG. 5B, the front end of the workpiece blank W is first reduced until the workpiece blank W engages against the end of the ejector pin 7. As soon as this engagement is reached, further movement of the punch 4 effects a forming of the subsequent screw head, as shown by FIG. 5C. In the end position according to the last method step of FIG. 5D, the later or subsequent head of the screw has also received its desired shape, so that the punch 4, which is connected with the carriage 3, can be retracted and the screw blank W can be ejected from the matrix 5 via the ejector pin 7.

For the purpose of monitoring the foregoing cyclically repetitive production process, the force occurring between the two oppositely movable machine parts, namely the carriage 3 on the one hand and the machine support 1 on the other hand, which force is responsible for the deformation procedure, is monitored with respect to its magnitude and its progress over the time interval of a complete cycle, i.e., during a full rotation of the crank drive 2. This force monitoring is effected by a continuous comparison of the actual values determined during the production with desired values, which were determined and stored in a preliminary run. Instead of the resultant or total force between the two oppositely movable machine parts, namely the carriage 3 and the machine support 1, only significant components of forces in the form of stresses are detected or determined as desired values and actual values. These stresses and determined within three machine elements with the embodiment presently under consideration.

A portion of the compressive stress occurring in the adjusting screw 11 during the deformation procedure, and representing the compressive-load application of the ejector pin 7, is determined as a component of force. The progress or curve of this component of force, during normal operating sequence of the deformation procedure, is represented with dot-dash lines in the graph of FIG. 6. In order to determine this component force, the adjusting screw 11, starting from the front end thereof, is provided with a center hole or bore 11a, with an inner thread being provided along the outer segment 11b thereof. A tubular force-measuring element or dynamometer 12 is supported at the base 11c of the hole 11a in the embodiment according to FIG. 3; the surface of the force-measuring element 12 is provided with several stress-measuring strips 13. This tubular force-measuring element 12 is held free of play, and possibly under preload, between the base 11c of the hole 11a, and a tensioning element; in the embodiment according to FIG. 3, the tensioning element is a setscrew 14. This setscrew 14 has a centering extension 14a which engages in the tubular force-measuring element 12. The setscrew 14 is screwed into the internally threaded segment 11b of the hole 11a. The portion of the segment 11b not filled or occupied by the setscrew 14 is occupied by the shaft of a cover screw 15, the head of which is provided with flat or key faces 15a, and forms an engagement surface for the ejector lever 10.

From the illustration in FIG. 4, it is clearly apparent that when the adjusting screw 11 is loaded in the axial direction, said loading originating from the ejector pin 7, material stresses in the form of compressive forces occur in the adjusting screw 11. These compressive forces are in part also transmitted to the stress-measuring strips 13 of the force-measuring element 12. In the stress-measuring strips 13, these compressive forces as a consequence have a change of the electrical resistance, so that electrical signals proportional to the forces are produced with the force-measuring element 12. These signals are conveyed from the setscrew 11 via measuring or slide wires 16a of a cable 16. As shown in FIG. 3, the cable 16 is located in a central bore of the setscrew 11. The cable 16 leads to a cable outlet 16b which is connected with a suitable amplifier.

As a second significant component of force of the deformation force occurring as a whole between the carriage 3 and the machine support 1, with the present embodiment there is measured a portion of the stress which occurs in the intermediate plate 6 and originates from the loading of the matrix 5. This component of force is represented with dash lines in the graph of FIG. 6.

As can be seen in the enlarged illustration of FIG. 4, the matrix or die 5 is supported during a loading in the direction of punching on the intermediate plate 6, which in turn rests against a part of the machine support 1. This intermediate plate 6, in the region of the abutting or engagement surface of the matrix 5, is provided with a center hole 6a which starts from the side of the machine support 1 and in the front part has a segment 6b which is provided with inner threads. A tubular force-measuring element or dynamometer 12 is also supported against the base 6c of this hole or bore 6a, and is provided with several stress-measuring strips 13 on the outer surface thereof. The electric measuring or slide wires of these stress-measuring strips 13 are not shown in FIG. 4 in order to facilitate illustration.

The force-measuring element 12 located in the center hole or bore 6a of the intermediate plate 6 is also fixed free of play in the bore 6a by a tensioning element embodied as a setscrew 14, with a centering extension 14a of the setscrew 14 at the same time effecting the necessary centering of the force-measuring element 12. By means of its stress-measuring strips 13, the force-measuring element 12 thus detects those stresses which occur in the region of the hole or bore 6a in the intermediate plate 6 and which are produced by a force component of the force exerted upon the matrix or die 5.

While the force-measuring element 12 in the adjusting screw 11, by measuring a component of force, delivers a significant indication of how the force application of the ejector pin 7 proceeds during the operating sequence of the deformation procedure, the force-measuring element 12 built into the intermediate plate 6 represents the stresses which result from a loading of the matrix 5. A comparison of the dash-dot curve with the dash line curve in FIG. 6 shows that during an orderly operating sequence of the deformation procedure, the matrix 5 is first acted upon by a force which is necessary for reducing the front end of the workpiece blank W, in conformity with the deformation segment, between the times $t_1$ and $t_2$. At the same time that this first force is reduced, an application of force on the ejector pin 7 now begins between the time points $t_2$ and $t_3$, because the workpiece blank W is now supported on this ejector pin 7. This component of force attains its peak in the time interval between the points of time $t_3$ and $t_4$, though it declines because, due to forming of the subsequent screw head, a considerable portion of the deformation force is transmitted by the punch die 4 directly onto the matrix or die 5 through the enlarging end segment of the workpiece blank W. The component of force measured in the intermediate plate 6 attains its maximum at the point of time $t_4$, and subsequently drops to zero, together with the component of force measured in the adjusting screw 11, when the punch 4 has reached its final position at the point of time $t_5$.

The curve depicted by a solid line in the graph of FIG. 6 represents the force transmission of that component of force which is measured by an appropriate arrangement of a force-measuring element in the punch 4. With correct arrangement of the force-measuring element within the punch 4 or within a machine element which supports the punch 4 on the carriage 3, the solid-line curve of FIG. 6 represents an addition of the components of force measured in the adjusting screw 11 and in the intermediate plate 6.

If the components of force detected for each production cycle deviate from the specified curve illustrated in FIG. 6, not only can a determination be made whether the deviation is within a permissible range, but also there can be determined which machine element is affected and at which point in time a deviation occurs. The employment of significant components of force for monitoring the production process accordingly permits not only an extremely exact and precise monitoring, but with deviations occurring also delivers clear indications as to where the error is to be sought. Overloading of the stress-measuring strips 13 is effectively prevented by the installation of the force-measuring elements 12 in the machine elements 6 and 11, which transmit significant components of force of the production process. The detection of components of force finally makes it possible to construct the force-measuring elements small enough that they can be installed without difficulty in process-significant locations.

A further exemplary embodiment is illustrated in FIGS. 7 and 8 with reference to a thread-rolling machine with which, for example, the screw blank made with the cold-deformation press or punch of FIG. 1 is provided with a thread.

The tool of such a thread-rolling machine is illustrated in FIGS. 7 and 8 and has a fixed rolling jaw or die 17 which is tightly clamped to a rolling jaw basket or cage 19 by means of a cover plate 18, and in particular with the aid of several screws 20. The rolling jaw cage 19 in turn is fixed to a basket or cage holder 22 by means of tightening screws 21; in the exemplary embodiment, the cage holder 22 has an angular cross section, so that two tightening screws 21 which are disposed at an angle to one another can be employed for fixing the position of the rolling jaw cage 19. The exact alignment of the rolling jaw cage 19 relative to the cage holder 22 is effected by two rows of adjusting screws 23, which are screwed into threaded bores of the cage holder 22 and act on intermediate pieces 24 which are inserted in the rolling jaw cage 19.

The deformation procedure for producing the thread on the workpiece W is effected with the aid of a second rolling jaw or die 25, which is movable in contrast to the stationary rolling jaw 17. The rolling jaw 25 is also mounted by a cover plate 26 to a rolling carriage 27. This carriage 27 carries out a back and forth movement, as indicated in FIG. 8 by the double arrow marked on the carriage 27. Due to the relative movement of the rolling jaw 25 with respect to the stationary rolling jaw 17, the workpiece W is moved in the direction of the two arrows marked in FIG. 8, whereby the workpiece rolls off along the profiling surfaces of the two rolling jaws 17 and 25.

With the force-converting rolling thread cutters described by the foregoing, components of force of the process force are transferred by the tightening screws 21 and the adjusting screws 23. A respective force-measuring element or dynamometer 28 is arranged in each of the two upper adjusting screws 23 for monitoring the deformation procedure; each force-measuring element 28 is constructed, for example, in the manner described relative to FIG. 3. With the aid of these force-measuring elements 28, it is possible at any given moment to detect a significant component of force in the form of stresses in the adjusting screws 23, not only as desired values but also as actual values, in order to monitor the cyclically repetitive production process of the rolling thread cutting.

Naturally, it is also possible to arrange force-measuring elements in the intermediate pieces 24 and in the rolling jaw cage 19, if the stresses prevailing in these parts are to be relied upon as significant components of force for process monitoring.

With the aid of the foregoing exemplary embodiments, there has been set forth how significant components of force in the form of stresses can be detected not only within cylindrical machine elements, such as, for example, setscrews or adjusting screws, but also within planar, flat, and solid machine elements, such as, for example, intermediate plates. This detection of the desired and actual values of significant components of force for monitoring production processes is possible not only during deformation procedures, but also during machining. In this event, in which for example a turning tool or bit is held on a tool carrier by various clamping screws in different alignments, individual screws, which are arranged at decisive locations, can be provided with a force-measuring element. Additionally, it is possible to provide the engagement surface of the turning tool in the tool holder with force-measuring elements in conformity with what was described with respect to the intermediate plate; such force-measuring elements would detect the stresses in the tool holder as significant components of force. If the machining is effected by several turning tools or bits, the chipping or machining force introduced via each turning tool respectively can be monitored separately via significant components of force. One situation, as described by the foregoing relative to the ejector pin 7, is provided relative to a machining process with capstan or turret lathes. The turret or revolver is provided with several tools which engage sequentially. The turret or revolver is arranged on a carriage which, for example via a cam drive, performs its feed movement. At least one abutment piece or one adjusting screw is provided by means of which the feeding forces are transferred from the cam drive via an intermediate lever onto the turret carriage. With the abutment piece or adjusting screw there is provided a machine element by means of which all of the feeding forces are transmitted during all workpiece engagement of the turret. It is thus possible, in the manner previously described, to detect significant components of force in the form of stresses within these machine elements, in order to detect the process force independently of the tool which is being used at any given time.

The present invention is, of course, in no way restricted to the specific disclosure of the specification and drawings, but also encompasses any modifications within the scope of the appended claims.

What we claim is:

1. A cold-solid deformation press in which, for monitoring the production process thereof, a force which occurs between two machine parts which are movable relative to one another is detected, said press comprising:

a machine support;

a tool including a punch part and a matrix part, as well as an ejector pin;

an ejector lever for actuating said ejector pin;

an adjusting screw for adjusting said ejector pin;

a carriage associated with said machine support for moving one of said tool parts relative to the other;

a machine element for supporting at least one of said tool parts relative to one of said machine support and said carriage; and at least two force-measuring elements for effecting said force detection of force absorbed by said tool parts; with one of said force-measuring elements being arranged in said adjusting screw, and with at least one force-measuring element being arranged in said machine element.

2. A press according to claim 1 wherein said machine element is provided with a recessed portion for accommodating said force-measuring element; and at least one holding element for fixing said force-measuring element in said recessed portion free of play.

3. A press according to claim 2, in which said recessed portion is a bore having a base, and in which said force-measuring element is fixed free of play in said bore by a single holding element between said base of said bore, and said holding element.

4. A press according to claim 3, in which said bore is provided with an internally threaded segment, and in which said holding element is a setscrew which is screwed into said internally threaded segment.

5. A press according to claim 4, in which said force-measuring element is tubular, and is provided on its surface with at least one stress-measuring strip.

6. A press according to claim 5, in which said setscrew is provided with a centering extension for said tubular force-measuring element.

7. A press according to claim 4, in which said force-measuring element is a measuring cell which operates piezoelectrically.

8. A press according to claim 4, in which said holding element is provided with a central bore, and in which said force-measuring element is provided with measuring wires accommodated in said central bore.

* * * * *